(12) United States Patent
Yetter

(10) Patent No.: US 7,129,592 B1
(45) Date of Patent: Oct. 31, 2006

(54) PORTABLE, HUMAN-POWERED ELECTRICAL ENERGY SOURCE

(76) Inventor: Gary L. Yetter, RR#1, Box 1022, Little Meadows, PA (US) 18830

(*) Notice: Subject to any disclaimer, the term of this patent is extended or adjusted under 35 U.S.C. 154(b) by 0 days.

(21) Appl. No.: 11/070,044

(22) Filed: Mar. 2, 2005

(51) Int. Cl.
*H02P 9/04* (2006.01)

(52) U.S. Cl. .................. 290/1 A; 290/1 E; 290/1 C; 290/1 D; 290/1 R; 322/1; 322/28; 322/7; 180/65 R; 185/10

(58) Field of Classification Search .............. 290/1 A, 290/1 E, 1 C, 1 D, 1 R; 322/1, 28, 7, 10, 322/12, 14, 32, 29; 180/65 R; 185/10
See application file for complete search history.

(56) References Cited

U.S. PATENT DOCUMENTS

| | | | |
|---|---|---|---|
| 5,880,532 A | * | 3/1999 | Stopher .................. 290/1 E |
| 6,133,642 A | * | 10/2000 | Hutchinson .............. 290/1 A |
| 6,291,900 B1 | * | 9/2001 | Tiemann et al. ........... 290/1 A |
| 2004/0072657 A1 | | 4/2004 | Arguilez |

* cited by examiner

*Primary Examiner*—Darren Schuberg
*Assistant Examiner*—Iraj A. Mohandesi
(74) *Attorney, Agent, or Firm*—Mark Levy & Associates, PLLC

(57) ABSTRACT

A human-powered, electrical generation system for intermittently receiving mechanical energy from a human and storing that mechanical energy. The stored mechanical energy is used to turn a generator that produces electrical power that is stored in a rechargeable battery. An optional inverter converts the DC power stored in the battery to AC power. A mechanical energy controller is provided to regulates the release of the stored mechanical energy. This allows intermittent energy release so that an intermittent electrical load may be properly supplied over a relatively long period of time without need for repeated energy input from the human. Mechanical energy may be stored in a spring arrangement or in a pressurized hydraulic reservoir. Hand cranks, levers, and pedals in optional combination with a gear box or multi-speed hub may be provided to add energy to the mechanical energy storage apparatus.

17 Claims, 6 Drawing Sheets

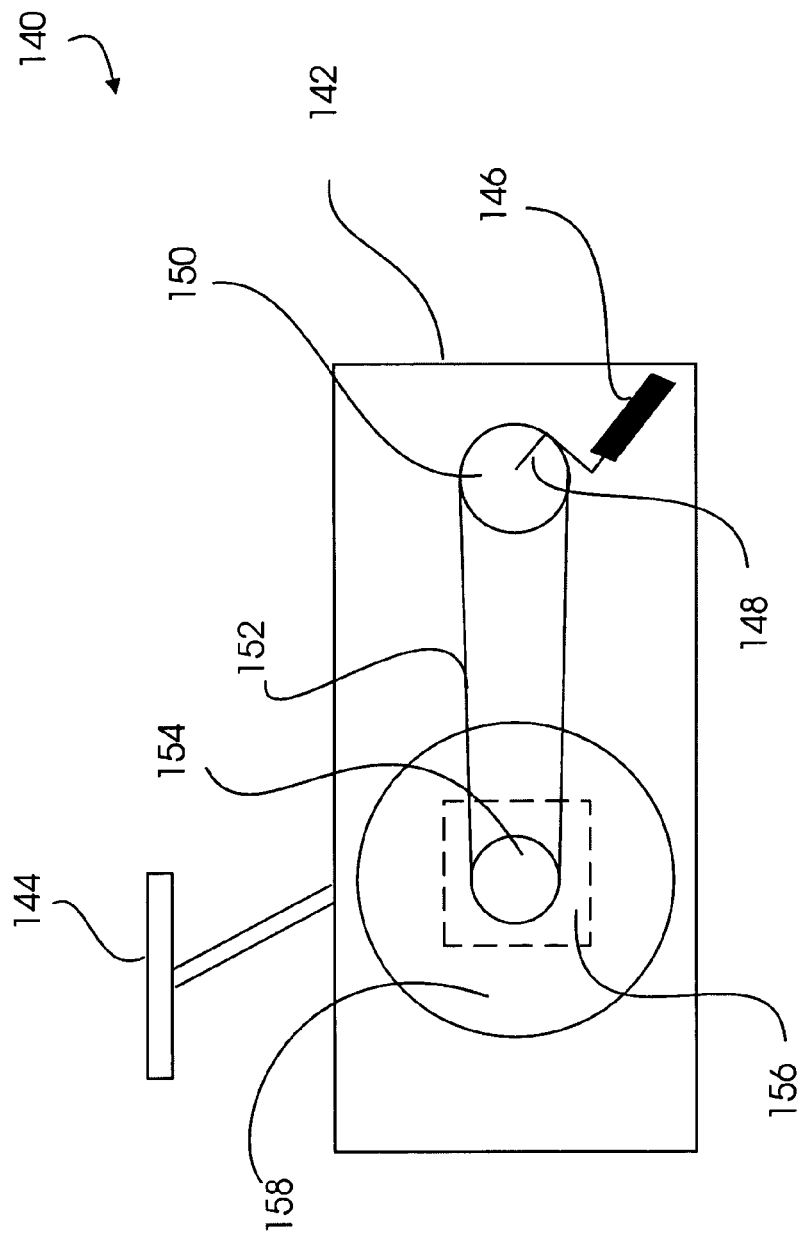

PORTABLE, HUMAN-POWERED ELECTRICAL ENERGY SOURCE

FIELD OF THE INVENTION

The present invention pertains to electrical generators and, more particularly, to a human-powered electrical power source that requires only intermittent input from the operator thereof.

BACKGROUND OF THE INVENTION

Today's society, at least in the industrialized parts of the world, has become almost totally dependent upon electricity. This presents several problems. First, the demand upon generation and transmission capacity occasionally overcomes the ability to generate and distribute enough power to meet the demand. This leads to all too common power brownouts and, in extreme cases, to complete blackouts. A second problem involves building transmission and distribution lines reaching into more and more remote regions as the population abandons urban and suburban areas and moves to such remote areas. Also, although stand-alone electrical generator systems have long been available for use in areas not served by the electrical transmission grid, the use of such portable generators presents another set of problems.

Portable generators, powered by a hydrocarbon fuel such as gasoline or diesel fuel typically produce inordinate amounts of pollution relative to the amount of electrical power generated. As the world struggles with greenhouse gas effects, such pollution becomes more and more problematic. Also, fuel must transported to the portable generator's location which may also present logistical, cost, and safety problems. For example, in dry woods or forest regions, even a small spark, such as from an improperly spark-suppressed internal combustion engine used by a camper or other visitor could start a forests fire.

Solar energy is emerging as a source of electrical power for use in remote areas. While solar power is generally non-polluting, the capital expense is typically high. In addition, many parts of the world experience insufficient sunshine to make solar power totally reliable at a particular time of need. Even in more sunny climes, of course, solar power cannot be generated at night.

Fuel cells are yet another portable source of electrical power. At the present time, at least two problems prevent their widespread use, at least in non-military applications. Initial cost of small, portable fuel cells is still high. In addition, many fuel cells require gaseous hydrogen as a fuel which is not yet readily available in the consumer market. Hydrogen also presents a safety hazard if improperly handled.

Human and animal-powered electrical generators have also been used but, heretofore, have not provided practical amounts of electricity to operate a refrigerator, for example, for extended periods of time.

DISCUSSION OF THE RELATED ART

Several attempts to provided human-powered electrical generators have been made. For example, U.S. Pat. No. 5,880,532 for WIND-UP POWER SOURCE WITH SPRING MOTOR AND VEHICLE INCORPORATING SAME, issued Mar. 9, 1999 to Robert D. Stopher, teaches a small electrical generation system utilizing a crank-wound series of springs as a mechanical power source. An electrical generator may be driven by the spring motor and used to power such small appliances as flashlights, cellular phones, walkie-talkies, lamps, lanterns, radios, televisions, mobile computers and the like. The output of the electrical generator may also be used to charge a battery external to the power generation system.

U.S. Pat. No. 6,133,642 for PORTABLE ELECTRICAL POWER GENERATING SYSTEM WITH MECHANICAL AND SOLAR POWER SOURCES, issued Oct. 17, 2000 to John Edmund Hutchinson, provides a small radio having a small, crank-driven electrical generator. The generator charges a capacitor or other storage device such as a battery which is capable of powering the radio for approximately one hour between charges. A solar cell built into the radio case provides an alternate power source to the radio.

U.S. Pat. No. 6,291,900 for ELECTRICAL ENERGY MANAGEMENT FOR MANUALLY POWERED DEVICES, issued Sep. 18, 2001 to Jerome Johnson Tiemann, et al., teaches another small apparatus having a spring motor adapted to turn a generator so as to supply power to a portable appliance such as a radio. A built-in battery receives a charge from the generator and electrical circuitry is provided to intelligently supply power from the battery to a connected load.

Published United States Patent Application No. 2004/0072657 for TANDEM EXERCISER AND POWER GENERATOR, published Apr. 15, 2004 upon application by Arcadio C. Arguilez, describes an electrical generator coupled to a tandem, stationary bicycle. Electrical power may be generated when one or both riders mount and pedal the bicycle.

None of the prior art references is seen to teach or suggest either individually or in any combination, the human-powered, portable electrical power generation system of the present invention.

SUMMARY OF THE INVENTION

In accordance with the present invention, there is provided a family of portable, human-powered, electrical power generation systems. Each power generation system typically has a spring motor that is sized in accordance with the desired power output requirement. The spring is periodically wound using one or more hand cranks, pedals, levers, handles, or another suitable man/machine interface. The wound spring releases the energy stored therein to turn an alternator or other suitable electrical generator. Circuitry is provided to regulate the alternator output, provide field power to the alternator, and control charging of the internal and/or external battery and regulation of the power available to an external load. When required, an inverter, motor-generator, or other arrangement is provided to convert DC into AC suitable to power the external load. In alternate embodiments, a hydraulic pump, a hydraulic fluid control, and a hydraulic motor may be inserted between the spring motor and the generator to provide better control of the release of mechanical energy from the wound spring.

It is, therefore, an object of the invention to provide a portable, human-powered, electrical energy source.

It is another object of the invention to provide a family of portable, human-powered, electrical energy sources in a range of sizes to provide power to diverse electrical loads, each having a different power requirement.

It is a further object of the invention to provide a portable, human-powered, electrical energy source having one or more cranks for turning by one or two people as an input mechanism for winding a spring.

It is an additional object of the invention to provide a portable, human-powered, electrical energy source having a bicycle-like pedal arrangement as an input mechanism for winding a spring.

It is a further object of the invention to provide a portable, human-powered, electrical energy source having a bicycle-like pedal arrangement having at least two gear ranges as an input mechanism for winding a spring.

It is another object of the invention to provide a portable, human-powered, electrical energy source that includes a battery or other energy storage arrangement.

It is a still further object of the invention to provide a portable, human-powered, electrical energy source which has a built-in charging facility for charging the internal battery from the AC mains when available.

It is yet another object of the invention to provide a portable, human-powered, electrical energy source utilizing a hydraulic system as an energy storage mechanism to intermittently, controllably release stored energy to turn an alternator.

BRIEF DESCRIPTION OF THE DRAWINGS

A complete understanding of the present invention may be obtained by reference to the accompanying drawings, when considered in conjunction with the subsequent detailed description, in which:

FIGS. 3, 3a and 3b are two schematic front views and a side elevational view, respectively, of a human-powered, electrical power generation system of the invention.

For purposes of brevity and clarity, like components and elements of the apparatus of this invention will bear the same designations or numbering throughout the FIGURES.

DESCRIPTION OF THE PREFERRED EMBODIMENT

The present invention provides a human-powered electrical power generation system.

Figure 1:
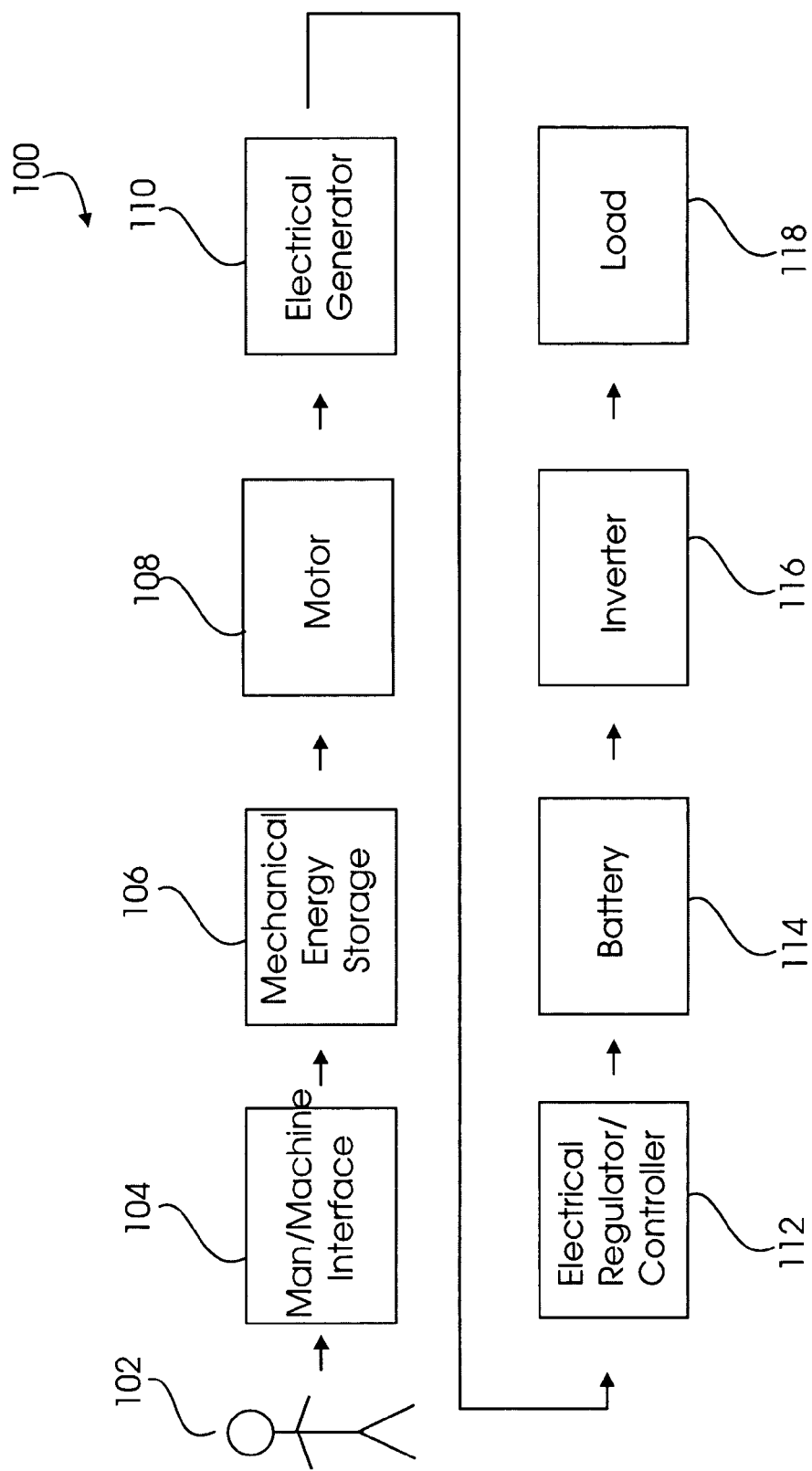
FIG. 1 is a generic system block diagram of the human-powered, electrical power generation system of the invention.

Referring first to FIG. 1, there is shown a generic system block diagram of a human-powered, electrical power generation system, generally at reference number 100. One or more persons 102 intermittently provide energy to system 100 using a man/machine interface 104. Man/machine interface 104 may consist of one or more cranks, a bicycle-like pedal arrangement, one or more levers, or any other arrangement, none of which is shown, by which mechanical energy may be transferred from person 102 to the mechanical energy storage mechanism (MESM) 106 of system 100.

If a hand crank arrangement is provided, a pair of offset cranks, not shown, on opposite sides of an enclosure may be provided. The horizontal spacing between the cranks is chosen so that person 102 may comfortably grasp one crank in each of his or her hands. It is also anticipated that if system 100 is to be hand-cranked, person 102 may assume a kneeling position. Consequently, in at least one embodiment of the inventive energy generation system 100, an appropriate padded kneeling platform, not shown, is provided.

If a bicycle-like pedal, not shown, is provided, it may form a permanent part of electrical power generation system 100. In alternate embodiments, the bicycle-like pedal arrangement may be provided as a totally or partially collapsible arrangement removably attachable to electrical power generation system 100.

Man/machine interface 104 may include gears, pulley systems, or other such mechanisms, not shown, to provide a mechanical advantage to person 102 as he/she imparts mechanical energy to electrical power generation system 100.

The electrical energy generation system 100 of the invention is intended to include any known and suitable mechanism usable as a man/machine interface 104, and therefore, the invention is not considered limited to the specific examples chosen for purposes of disclosure.

Regardless of the specific mechanism forming man/machine interface 104, the energy transferred from person 102 is stored in MESM 106, which typically comprises one or more springs, not shown, that may be wound. Once wound, the spring or springs may release their stored energy over a period of time much the same way that a clock may be periodically wound and then run for several days.

A motor 108 powered by energy stored in MESM 106 is adapted to receive that energy and provide an output, typically rotary, therefrom. Motor 108 may include any necessary controls for periodically starting and stopping motor 108. A speed regulator or governor, not shown, may optionally be provided to ensure a relatively constant output speed from motor 108.

A shaft, not shown, of motor 108 is mechanically coupled to electrical generator 110. While the term generator is used for matters of simplicity, an alternator may also be used. The term generator as used herein is intended to include any and all such electrical generation devices.

An electrical output of generator 110 is provided to a regulator/controller 112. Regulator/controller 112 provides, as required, several functions within electrical power generation system 100. First, the output voltage of generator 110 is regulated. In addition, charging of battery 114 may also be controlled. Finally, when an alternator is used as the electrical generation element 110, controller/regulator 112 is used to control the electrical power applied to the field windings, not shown, thereof.

One or more rechargeable batteries 114 are used both to moderate the flow of electrical energy from generator 110 to load 118 as well as to provide power which may not require the continuous operation of generator 110. Battery 114 may comprise any type of electrochemical cell capable of storing electrical energy. One or more sealed, lead-acid batteries may be suitable for medium capacity systems 100 while NiCad, Lithium ion, metal-hydroxide or other types of rechargeable batteries known to those of skill in the art may be provided in combinations of serial and parallel cells to provide the required DC voltage and current. The invention is intended to include any rechargeable battery or similar device and is, therefore, not considered limited to those battery types chosen for purposes of disclosure.

If AC power is required, a motor-generator, not shown, or preferably an inverter 116 is provided to receive DC power from battery 114 and to convert that power to an acceptable AC voltage at a predetermined frequency, typically 60 Hz. An output voltage of 117, 210, or 220/230, either single or three-phase power may be provided. DC-to-AC inverters are considered well known to those of skill in the power arts and further disclosure is neither required nor provided. It will be recognized that other output voltages, frequencies, or power phases may readily be provided to meet a particular operating circumstance or environment.

As varying power needs are anticipated for a variety of purposes, the inventive system may be provided in several different power generation capacities. Small units providing power for lamps, small communication equipment, small electrical appliances such as electric razors, etc. may be built in light-weight, compact configurations which may easily fit into a backpack or other small space. At the other extreme, large units capable of providing a kilowatt or more of power may also be constructed, such units typically both weighing more and occupying correspondingly larger volumes than the small capacity units.

The foregoing description provides a generic overview of the structure and operation of a human-powered, electrical generation system of the present invention. Many variations, additions, and features are possible.

Figure 2:
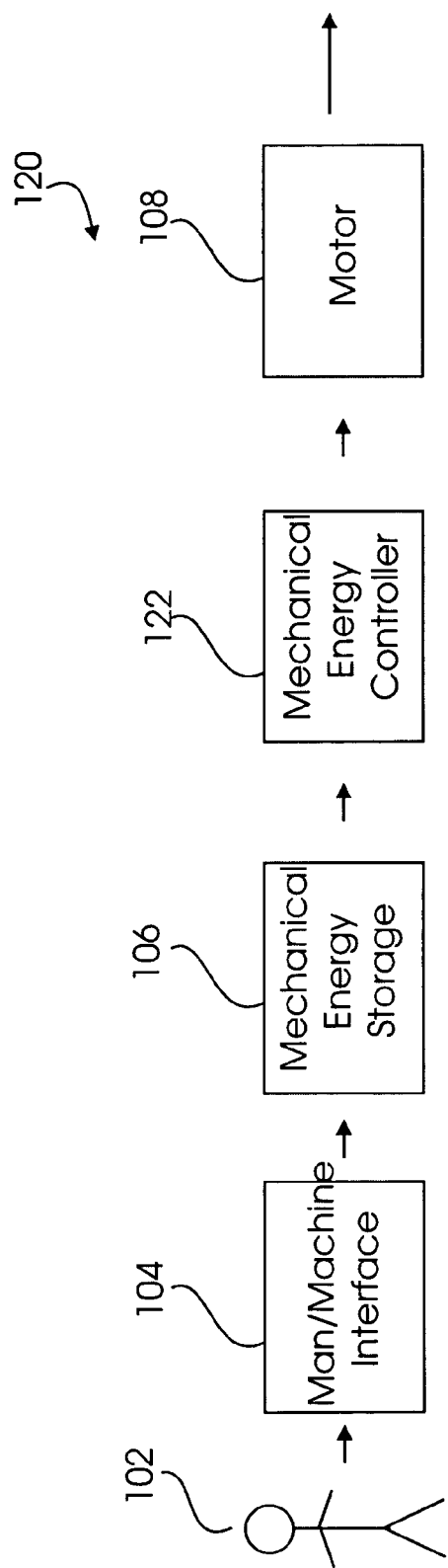
FIG. 2 is a portion of the generic system block diagram of FIG. 1 showing an alternate embodiment of the power generation of FIG. 1.

Referring now to FIG. 2, there is shown a portion of the system block diagram of FIG. 1, generally at reference number 102. As may be seen, a mechanical energy controller 122 is inserted between MESM 106 and motor 108. Controller 122 is disposed to regulate the release of energy from MESM 106 to motor 108. This function may be a simple, on-off control or may take the form of a more sophisticated controller. Such control is useful, for example, if a load has a highly intermittent electrical energy demand. For example, a refrigerator, not shown, typically cycles as the internal temperature exceeds a predetermined value. When the refrigerator's compressor starts, the electrical load imposed on system 100 (FIG. 1) goes quickly from substantially zero to a high value. Battery 114 (FIG. 1) begins supplying power to the refrigerator through inverter 116. Because the load is so great, the charge in battery 116 may quickly be depleted. As this happens, mechanical energy controller 122 allows potential energy in MESM 106 to be released and motor 108 to turn generator 110 (FIG. 1) so as to produce electrical power both to charge battery 114 and to supply power to the refrigerator.

As the internal temperature in the refrigerator drops, the refrigerator will eventually shut off. When this happens, the entire electrical output of generator 110 may be used to recharge battery 114. When battery 114 is again fully charged, controller 122 stops providing energy to motor 108. This arrangement allows battery 114 to have a reasonable size and weight as it is not the only controllable energy storage device in system 100. In other words, battery 114 need not supply the entire amount of energy necessary to run the refrigerator for an extended period of time. If MESM 106 is properly sized, the hypothetical refrigerator may be able to run normally for several hours without need for human intervention to resupply mechanical energy to MESM 106. This might typically happen, for example, during the night when the human who normally supplies mechanical energy to MESM 106 desires uninterrupted sleep.

Figure 3:
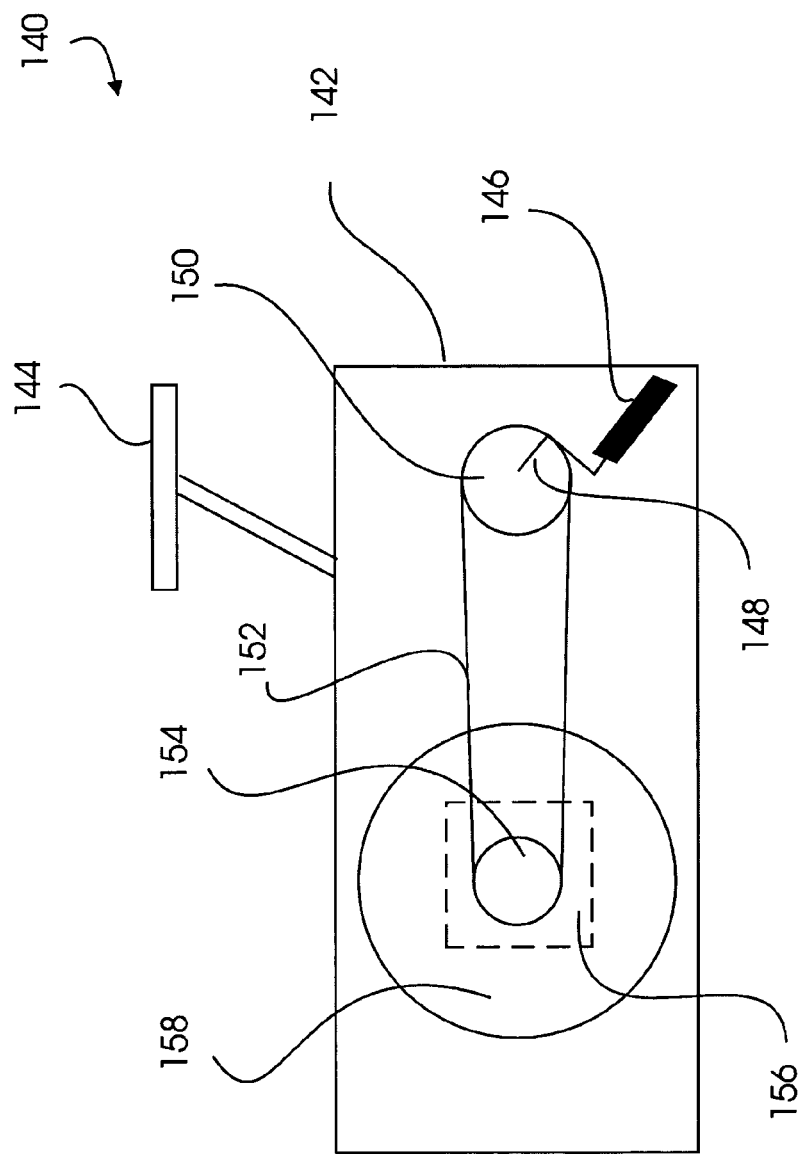
Figure 3B:
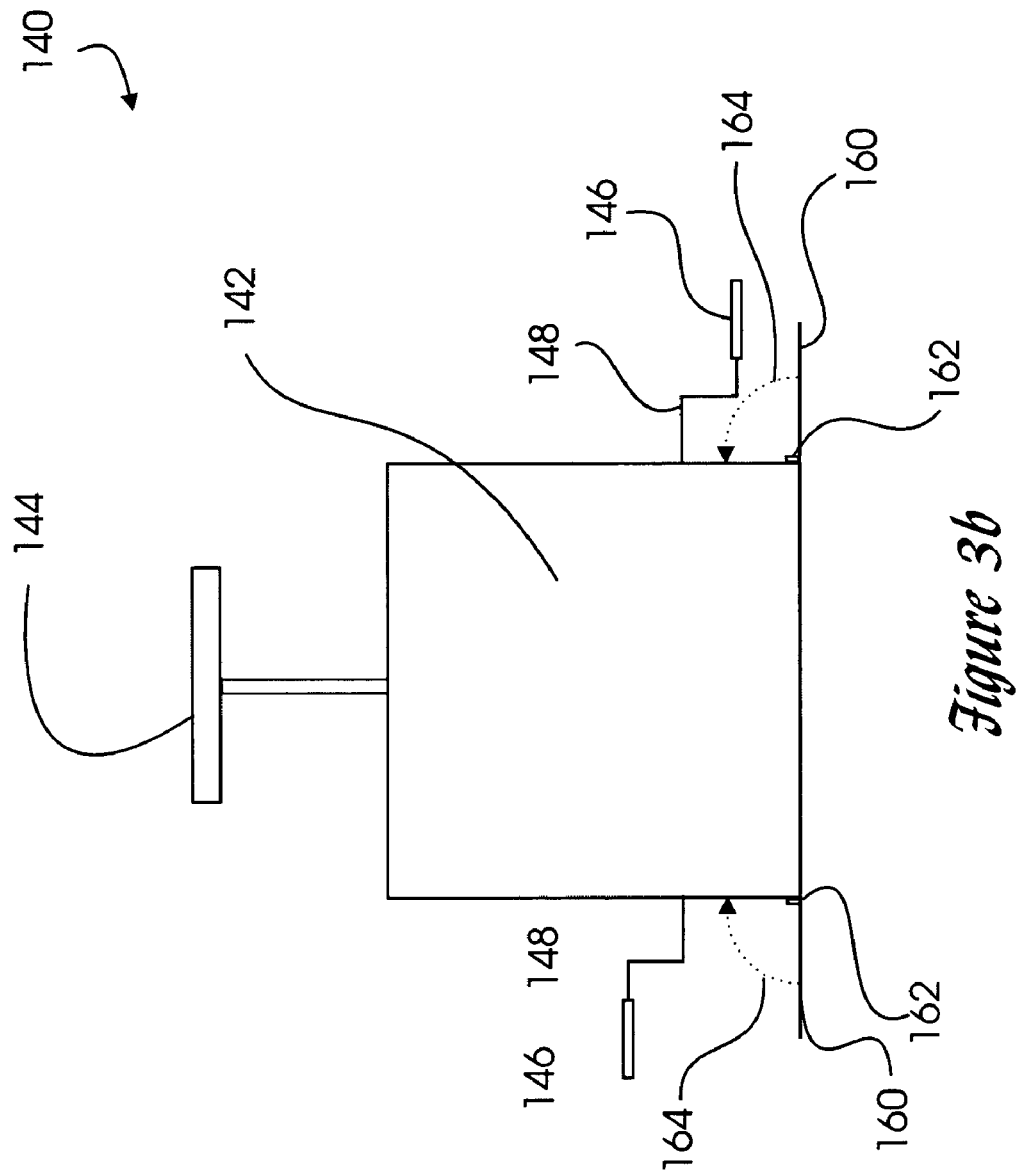

Referring now to FIGS. 3, 3a and 3b, there are shown two schematic side views and an end elevational view, respectively, of a portion of a first embodiment of a human-powered electrical generation system, generally at reference number 140. A housing 142 supports a seat 144 positioned to support a human, not shown. Seat 144 may be made adjustable using any of the techniques known to those of skill in, for example, the bicycle arts.

A pedal block 146 is disposed an appropriate distance from seat 144 and is adapted to receive the bottom of the human's foot. Pedal blocks 146 are supported on cranks 148 which are, in turn, coupled to a sprocket 150. It is anticipated that cranks 148 are arranged to be offset approximately 180° from each other on opposing side of housing 142.

Sprocket 150 is connected by chain 152 to a second sprocket 154 disposed on a winding mechanism 156. It will be recognized that a cog belt, a poly-v belt, or other suitable transmission mechanism, not shown, may be used in place of chain 152. A gear box, not shown, or a multi-speed hub, not shown, may also be provided in conjunction with the drive train consisting of sprocket 150, chain 152, and sprocket 154. Such an arrangement allows spring 158 to be wound at a higher speed in the early stages of tightening. As spring 158 tightens, the amount of torque necessary to continue the tightening process increases and the gear box or multi-speed hub may be down-shifted to provide a mechanical advantage to the person winding the spring. This is a similar process to a cyclist down-shifting a bicycle as a hill he or she is climbing becomes steeper and steeper.

Winding mechanism 156 is connected to a coil spring 158 adapted to receive energy from winding mechanism 156 and to store the energy so received. Suitable winding mechanisms are known to those of skill in the art and further disclosure is not necessary.

Coil spring 158, upon demand, may release its stored mechanical energy through a suitable motor, not shown. Mechanical springs 158, sometimes called constant force springs housed in suitable cases or cages, not shown, are well known to those of skill in the art. Such springs 158 are generally made from stainless steel, high-carbon steel, or sometimes from special alloys such as Elgiloy™ and Inconel™ and the like. They are available in a wide variety of widths and lengths to store different amounts of potential energy. Suitable springs are manufactured by Vulcan Spring & Mfg. Co., 501 Schoolhouse Road, Telford, Pa. 18969 as their Conforce® product line. Equivalent springs are available from other spring manufacturers.

An indicator, not shown, may be provided to indicate the approximate amount of energy remaining in spring. A simple mechanical indicator that moves as the spring unwinds and it outside diameter increases in one such method of performing this task. Such a mechanical indicator could, of course, be coupled to a potentiometer or other sensor within an electrical circuit and an electrical (e.g., a meter) or an electronic display used to indicate to a user the approximate potential energy remaining in spring 158. It will be recognized that many other way also exist to measure or sense the remaining potential energy.

A pair of fold-down flaps 160 are provided at the base of housing 142 to help stabilize the housing while spring 158 is being wound. A hinge 162 is provided at the proximal, longitudinal edge of each flap 160 allowing flap 160 to be rotated upward against the side of housing 142 as shown by arrows 164. Suitable fastening means may be provided to secure flaps 160 against the side of housing 142.

Figure 4:
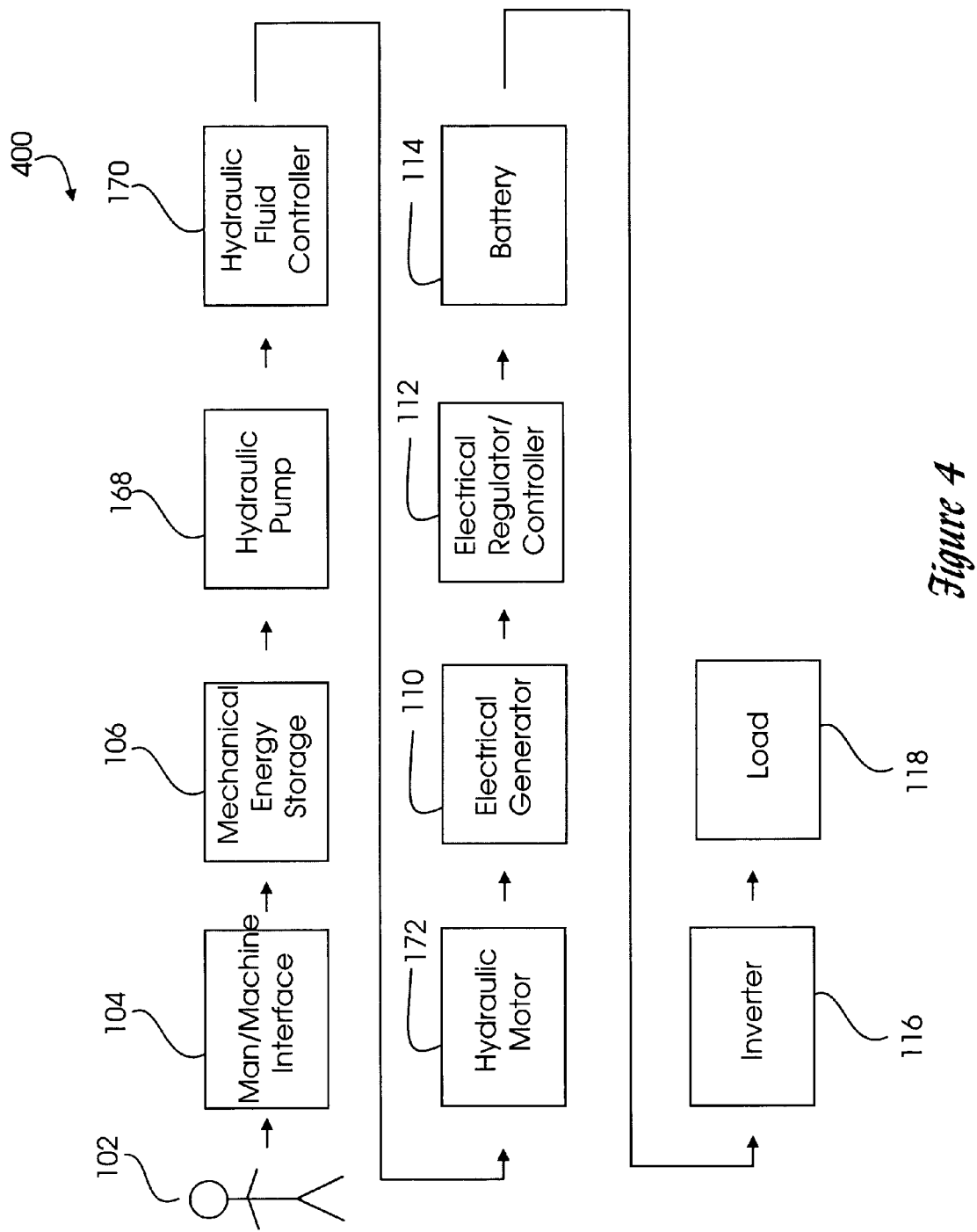
FIG. 4 is a generic system block diagram of an alternate embodiment of the human-powered, electrical power generation system of FIG. 1.

Referring now to FIG. 4, there is shown a schematic diagram 400 of an alternate embodiment of the human-powered, electrical energy generation system 100 of FIG. 1. A hydraulic pump 168 is connected to mechanical energy storage device 110. Hydraulic pump 168 pressurizes hydraulic fluid which is regulated by hydraulic fluid controller 170, the hydraulic fluid filled the turning hydraulic motor 172. Hydraulic motor is connected to electrical generator 110. In all other regards, electrical energy generation system 400 operates identically to electrical energy generation system 100 of FIG. 1 as been described hereinabove. One advantage of a hydraulic-enhanced system 400 compared to the purely mechanical system 100 of FIG. 1, is that a hydraulic system provides ease of control, especially in implementing a mechanical energy control 122 (FIG. 2) for intermittently starting and stopping motor 108 (FIG. 1). The mechanical energy control may be accomplished by a simple valve 170 (i.e., the hydraulic fluid controller) compared to a more complex mechanical control arrangement necessary in the mechanical system of FIG. 3.

Since other modifications and changes varied to fit particular operating requirements and environments will be apparent to those skilled in the art, the invention is not considered limited to the examples chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A human-powered, electrical power generation system comprising:
   a) means for storing mechanical energy;
   b) means for transferring mechanical energy from a human, operatively connected to said means for storing mechanical energy;
   c) means operatively connected to said means for storing mechanical energy, for converting stored mechanical energy to an output motion;
   d) an electrical alternator operatively connected to said means for converting stored mechanical energy and adapted to receive said output motion, said electrical alternator having an electrical output; and
   e) a regulator/controller operatively connected to said electrical output and comprising means for supplying a field voltage to said alternator.

2. The human-powered, electrical power generation system as recited in claim 1, wherein said means for storing mechanical energy comprises a spring.

3. The human-powered, electrical power generation system as recited in claim 2, wherein said spring comprises a coil spring formed from at least one of the materials: stainless steel, high-carbon steel, ELGILOY and INCONEL.

4. The human-powered, electrical power generation system as recited in claim 1, further comprising:
   f) a battery operatively connected to at least one of said alternator and said regulator/controller and adapted to receive said electrical output therefrom.

5. The human-powered, electrical power generation system as recited in claim 1, wherein said means for transferring mechanical energy from a human comprises at least one of a crank, a lever, and a pedal arrangement.

6. The human-powered, electrical power generation system as recited in claim 1, wherein said output motion comprises rotary motion.

7. The human-powered, electrical power generation system as recited in claim 1, further comprising:
   f) means for controlling mechanical energy disposed intermediate said means for storing mechanical energy and said alternator.

8. The human-powered, electrical power generation system as recited in claim 1, further comprising:
   f) means for indicating a quantity of potential energy remaining in said means for storing mechanical energy.

9. A human-powered, electrical power generation system comprising:
   a) means for storing mechanical energy;
   b) means for transferring mechanical energy from a human, operatively connected to said means for storing mechanical energy;
   c) means operatively connected to said means for storing mechanical energy, for converting stored mechanical energy to an output motion;
   d) a hydraulic pump connected to said means for converting stored mechanical energy to an output motion adapted to receive said output motion and pressurize hydraulic fluid;
   e) a hydraulic motor operatively connected to said hydraulic pump and adapted to receive said pressurized hydraulic fluid therefrom and for generating rotary motion; and
   f) an electrical generator operatively connected to said hydraulic motor and adapted to receive said rotary motion, said electrical generator having an electrical output.

10. The human-powered, electrical power generation system as recited in claim 9, further comprising:
    g) a battery operatively connected to said generator and adapted to receive said electrical output therefrom; and
    h) a regulator/controller operatively connected to both said electrical output and said battery.

11. The human-powered, electrical power generation system as recited in claim 9, wherein said means for transferring mechanical energy from a human comprises at least one of a crank, a lever, and a pedal arrangement.

12. The human-powered, electrical power generation system as recited in claim 10, wherein said generator comprises an alternator and said regulator/controller comprise means for supplying a field voltage to said alternator.

13. The human-powered, electrical power generation system as recited in claim 9, wherein said output motion comprises rotary motion.

14. The human-powered, electrical power generation system as recited in claim 9, further comprising:
    g) means for controlling hydraulic fluid disposed intermediate said hydraulic pump and said hydraulic motor.

15. The human-powered, electrical power generation system as recited in claim 14, wherein said means for controlling hydraulic fluid comprises a valve.

16. The human-powered, electrical power generation system as recited in claim 9, further comprising:
    g) means for indicating a quantity of potential energy remaining in said means for storing mechanical energy.

17. A method of generating electrical power, the steps comprising:
    a) providing a human-powered, electrical power generation system comprising a mechanical energy storage device and an electrical alternator operatively connected thereto and adapted to generate electrical power from mechanical energy stored in said mechanical energy storage device, a regulator comprising means for supplying a field voltage to said alternator, and a rechargeable battery;
    b) adding mechanical energy from a human to said mechanical energy storage device; and
    c) generating electrical energy from said stored mechanical energy.

* * * * *